(12) United States Patent
Kimura et al.

(10) Patent No.: US 6,725,657 B1
(45) Date of Patent: Apr. 27, 2004

(54) POWER TRANSMISSION DEVICE

(75) Inventors: Katsumi Kimura, Tokyo (JP); Kazuo Hattori, Tokyo (JP); Hiroshi Ogata, Tokyo (JP); Michio Otsuka, Tokyo (JP); Kazuhiko Sugiyama, Tokyo (JP); Yoshinori Kataya, Tokyo (JP)

(73) Assignee: Ebara Corporation, Tokyo (JP)

( * ) Notice: Subject to any disclaimer, the term of this patent is extended or adjusted under 35 U.S.C. 154(b) by 9 days.

(21) Appl. No.: 10/111,416

(22) PCT Filed: Nov. 9, 2000

(86) PCT No.: PCT/JP00/07872

§ 371 (c)(1),
(2), (4) Date: May 7, 2002

(87) PCT Pub. No.: WO01/35003

PCT Pub. Date: May 17, 2001

(30) Foreign Application Priority Data

Nov. 10, 1999 (JP) .............................. 11-319365

(51) Int. Cl.$^7$ .......................... F16D 31/00; F16H 41/00
(52) U.S. Cl. ............................................ 60/339; 60/351
(58) Field of Search ........................ 60/351, 339, 347, 60/357

(56) References Cited

U.S. PATENT DOCUMENTS 3,521,451 A * 7/1970 Langlois .................... 60/351
3,733,821 A * 5/1973 Bilton ....................... 60/351
4,023,362 A * 5/1977 Rogner et al. ............... 60/351

FOREIGN PATENT DOCUMENTS

| JP | 60-227011 | 11/1985 |
| JP | 62-37574 | 2/1987 |
| JP | 8-159080 | 6/1996 |
| JP | 9-88957 | 3/1997 |

OTHER PUBLICATIONS

Tomoo Ishihara, et al., "Ryuutai Hensokuki–Torque Converter", Ohm sha, Dec. 15, 1954, pp. 22–28.
English translation of the International Preliminary Examination Report issued in connection with the International Application No. PCT/JP00/07872.

* cited by examiner

*Primary Examiner*—Thomas E. Lazo
(74) *Attorney, Agent, or Firm*—Westerman, Hattori, Daniels & Adrian, LLP (57) ABSTRACT

The present invention relates to a power transmission apparatus for transmitting power by utilizing kinetic energy of a fluid, such as a torque converter, a fluid coupling, or the like. In a power transmission apparatus for taking out kinetic energy given to a fluid for power transmission by a prime mover as rotational power, water is supplied as a working fluid to a coupling section comprising an impeller (10) and a runner (11), water is supplied as a lubricating fluid to lubricate bearings (8, 9) for supporting an input shaft (7) and an output shaft (16) which are connected respectively to the impeller (10) and the runner (11), and water is supplied as a working fluid in a hydraulic servo mechanism for controlling a scoop tube (14) for adjusting the amount of water in the coupling section.

9 Claims, 7 Drawing Sheets

POWER TRANSMISSION DEVICE

TECHNICAL FIELD

The present invention relates to a power transmission apparatus for transmitting power by utilizing kinetic energy of a fluid, such as a torque converter, a fluid coupling, or the like.

BACKGROUND ART

Heretofore, there has been known a power transmission apparatus such as a fluid coupling and a torque converter having a pump impeller coupled to a drive shaft (input shaft) and a turbine impeller coupled to a driven shaft (output shaft) for transmitting power from the drive shaft to the driven shaft through a fluid filled in a casing.

This power transmission apparatus is advantageous in that since it uses oil as a working fluid for power transmission and also uses oil to lubricate bearings thereof, a shaft sealing device is not required between a power transmission section and bearings of the transmission apparatus. However, management of oil is troublesome at the time of overhaul, and treatment of waste oil is problematic from the viewpoint of environmental issue.

Although there is known a power transmission apparatus in which water is used as a working fluid, in this case also, oil or grease is used to lubricate bearings of the transmission apparatus, and hence a shaft seal device is required to be provided between a power transmission section and the bearings of the transmission apparatus, thus making the power transmission apparatus complex in structure.

If a scoop tube is used for speed control in a variable-speed fluid coupling which is one type of power transmission apparatus, then the scoop tube is controlled by a motor servo system, a pneumatic servo system, or a hydraulic servo system.

If water that is inexpensive and can easily be maintained and managed is used as a working fluid for power transmission, then there is a demand for using water to lubricate the bearings of the power transmission apparatus and to operate a servo mechanism for speed control for thereby making the power transmission apparatus structurally simple. In this case, it is a subject to use radial bearings and thrust bearings that can be lubricated by water, and a hydraulic servo mechanism in the power transmission apparatus.

DISCLOSURE OF INVENTION

The present invention has been made in view of the foregoing circumstances. It is therefore an object of the present invention to provide a power transmission apparatus which can use water as a working fluid for power transmission and also can use water to lubricate bearings and operate a speed-control servo mechanism.

In order to achieve the above object, there is provided a power transmission apparatus for taking out kinetic energy given to a fluid for power transmission by a prime mover as rotational power, characterized in that water is used as the fluid for power transmission and a lubricating fluid for bearings in the power transmission apparatus.

According to the present invention, the power transmission apparatus has radial bearings comprising sleeve bearings and thrust bearings comprising spiral hydrodynamic bearings, and these radial and thrust bearings can be lubricated by water. A control equipment also has such a structure that water can be used by using a hydraulic servo mechanism or the like.

Figure 7:
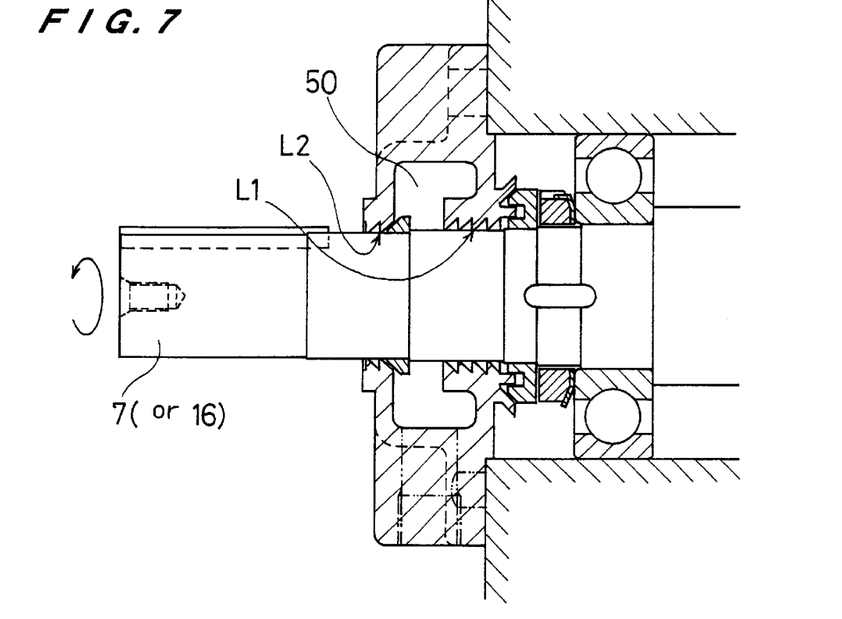
FIG. 7 is a cross-sectional view showing a shaft sealing structure in a conventional power transmission apparatus.
Figure 8:
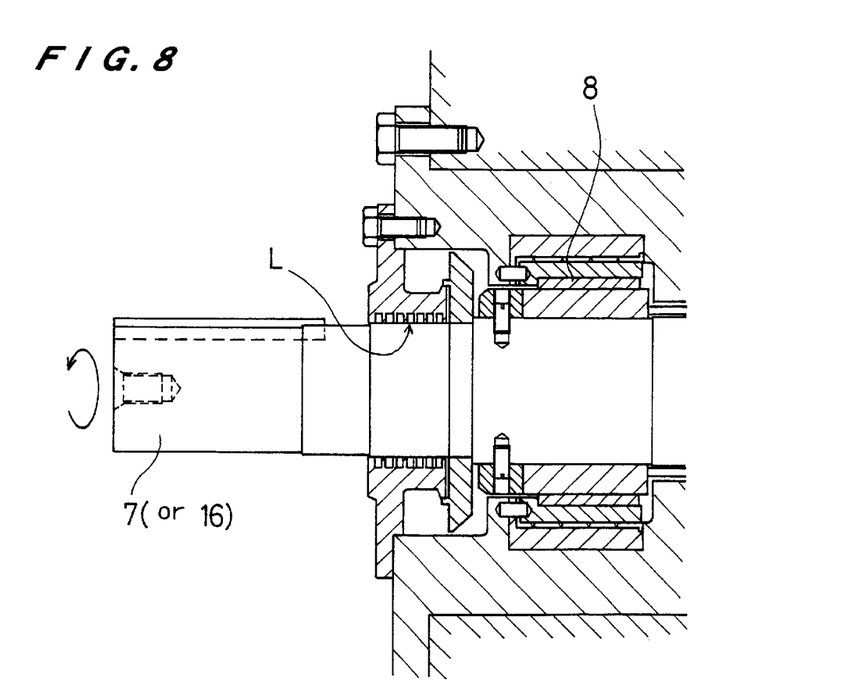
FIG. 8 is a cross-sectional view showing a shaft sealing structure in a power transmission apparatus according to the present invention.

By replacing oil with water as a working fluid for power transmission and also a lubricating fluid for the bearings in the power transmission apparatus, the following advantages can be obtained:

(1) A conventional shaft sealing structure provided at each of the opposite ends of the shaft in a variable-speed fluid coupling is shown in FIG. 7 of the accompanying drawings, and a shaft sealing structure according to the present invention is shown in FIG. 8 of the accompanying drawings. As shown in FIGS. 7 and 8, whereas a dual labyrinth structure is employed on each of the opposite ends of an input shaft and an output shaft in the conventional shaft sealing structure, a single labyrinth structure is employed on each of the opposite ends of an input shaft and an output shaft according to the present invention.

As shown in FIG. 7, in the conventional shaft sealing structure, two labyrinth structures L1 and L2 are disposed on each shaft end of the input shaft 7 (or the output shaft 16), and a centrifugal leakage water discharging mechanism 50 is disposed between the two labyrinth structures L1 and L2. With this arrangement, a fluid (oil) that has leaked from the first labyrinth structure L1 is trapped by the centrifugal leakage water discharging mechanism 50. Even if the fluid leaks from the centrifugal leakage water discharging mechanism 50, the fluid is prevented from further leaking out by the second labyrinth structure L2.

According to the present invention, only the single labyrinth structure L on each shaft end of the input shaft 7 (or the output shaft 16) is enough to prevent the fluid from leaking out. Even if the fluid leaks from the labyrinth structure L, it has no adverse effect on the environment because it is water.

(2) If the fluid is oil, then the temperature of the fluid increases as the power transmission apparatus operates, and the fluid is turned into minute particles or a mist, and is atomized. Therefore, the power transmission apparatus has an oil mist separator.

If the fluid is water, then even when it is turned into a mist, it has no adverse effect on the environment at all. Therefore, the power transmission apparatus is not required to have an oil mist separator and an air breather which would normally be needed.

BRIEF DESCRIPTION OF DRAWINGS

FIGS. 5A and 5B are views showing the structure of a radial bearing in the variable-speed fluid coupling shown in FIG. 1, and FIG. 5A is a cross-sectional view and FIG. 5B is a side elevational view;

FIGS. 6A and 6B are views showing the structure of a stationary thrust bearing in the variable-speed fluid coupling shown in FIG. 1, and FIG. 6A is a cross-sectional view and FIG. 6B is a side elevational view;

BEST MODE FOR CARRYING OUT THE INVENTION

A power transmission apparatus according to an embodiment of the present invention will be described below with reference to the drawings. In the present embodiment, a fluid coupling will be described by way of example as the power transmission apparatus.

Fluid couplings include constant-speed fluid couplings, variable-speed fluid couplings for controlling the amount of a working fluid to be supplied to an impeller, and variable-speed fluid couplings for controlling the amount of a working fluid in a rotating section by a scoop tube while the amount of the working fluid to be supplied is being kept constant. A radial bearing and a thrust bearing which are used in the power transmission apparatus according to the present invention are the same, irrespective of the type of the fluid coupling.

Figure 1:
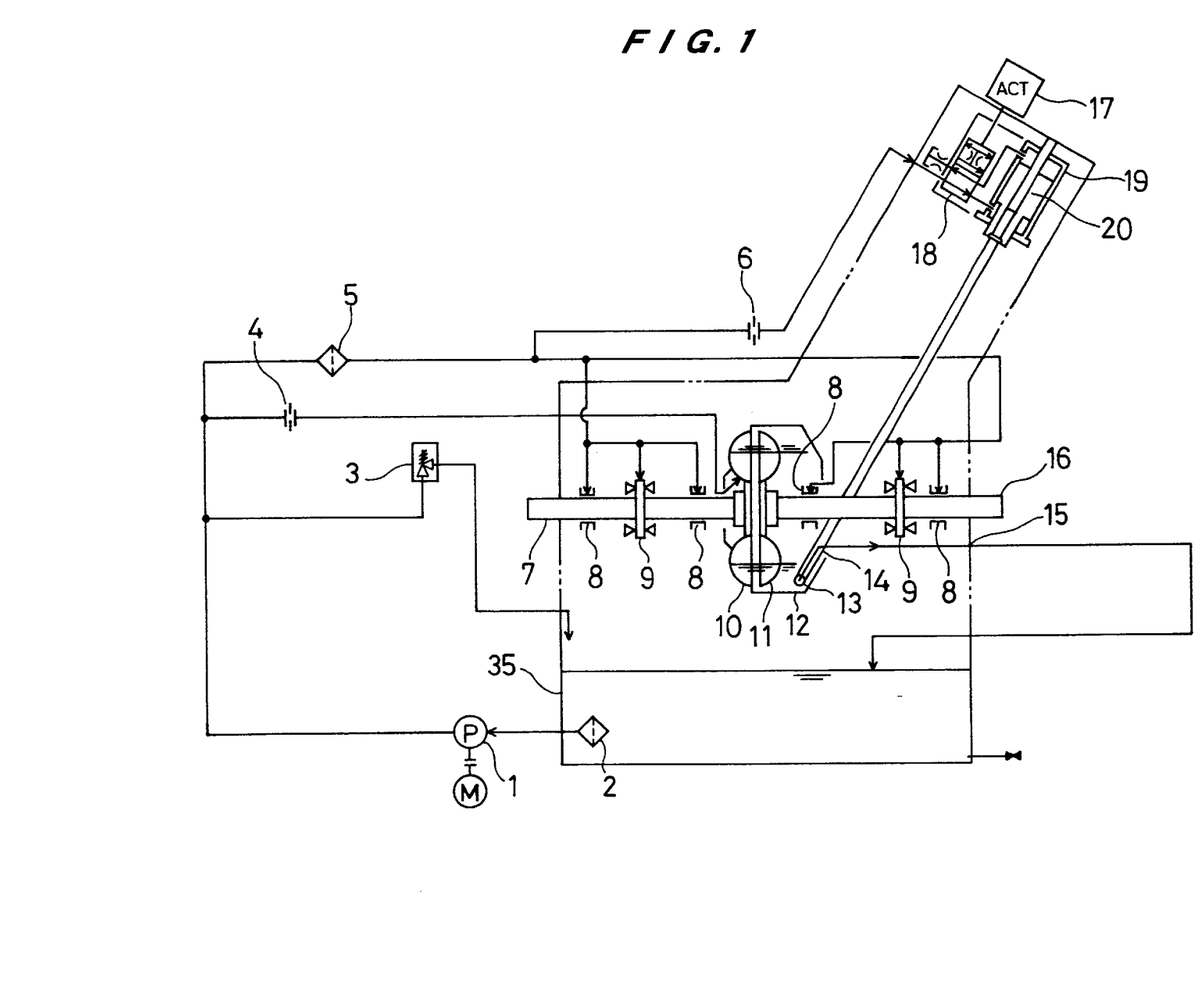
FIG. 1 is a view showing an overall structure of a variable-speed fluid coupling as an example of a power transmission apparatus according to the present invention.

FIG. 1 is a view showing an overall structure of a variable-speed fluid coupling according to the present invention which uses water as a working fluid for power transmission and uses a scoop tube for speed control. The variable-speed fluid coupling according to the present invention uses water as a working fluid for power transmission, a lubricating fluid for lubricating bearings, and a control fluid, and uses a scoop tube for speed control.

As shown in FIG. 1, an impeller 10 is coupled to an input shaft 7, and a runner 11 is coupled to an output shaft 16. An impeller casing 12 is fixed to the impeller 10. Each of the input shaft 7 to which the impeller 10 is fixed and the output shaft 16 to which the runner 11 is fixed is supported by two radial bearings 8 and one thrust bearing unit 9. The impeller 10, the runner 11, and the impeller casing 12 jointly define a working chamber (coupling section) to which water is supplied as a working fluid for power transmission.

The fluid coupling has a water tank 35 for the working water at a lower portion thereof. Water delivered through a suction strainer 2 is pressurized by a pump 1, and the pressurized water has its pressure determined by a pressure determining valve 3 and is used as working water for power transmission, lubricating water for lubricating bearings, and control water. Specifically, the pressurizing pump 1 draws in water through the strainer 2 disposed in the water tank 35, and pressurizes the water, and discharges the water having a certain pressure which is determined by a pressure setting of the pressure determining valve 3 provided at the discharge side of the pump. The working water for power transmission in the fluid coupling is supplied via an orifice 4 to the working chamber. The radial bearings 8 and the thrust bearing units 9 which support the input shaft 7 and the output shaft 16 are lubricated by water supplied from the pressurizing pump 1. The water is supplied to the radial bearings 8 and the thrust bearing units 9 through a lubricating water filter 5. A hydraulic servo mechanism is disposed for controlling a scoop tube 14. The hydraulic servo mechanism is operated by water supplied from the pressurizing pump 1. The water which has passed through the lubricating water filter 5 is restricted in flow rate by an orifice 6 and then supplied to the hydraulic servo mechanism.

In the hydraulic servo mechanism, a servo actuator 17 rotates a pilot valve 18 to bring a groove defined in the surface of the pilot valve 18 into communication with a hole in a follow-up piston 20, thereby introducing the pressurized water into the follow-up piston 20. Thus, the follow-up piston 20 moves forward or backward to a position where the fluid passage created by the rotation of the pilot valve 18 is closed. Therefore, the scoop tube 14 which is directly connected to the follow-up piston 20 and has a nozzle 13 on its distal end is moved to control the amount of water in the impeller casing 12. The reference numeral 19 represents a housing which accommodates the follow-up piston 20 therein.

Figure 2:
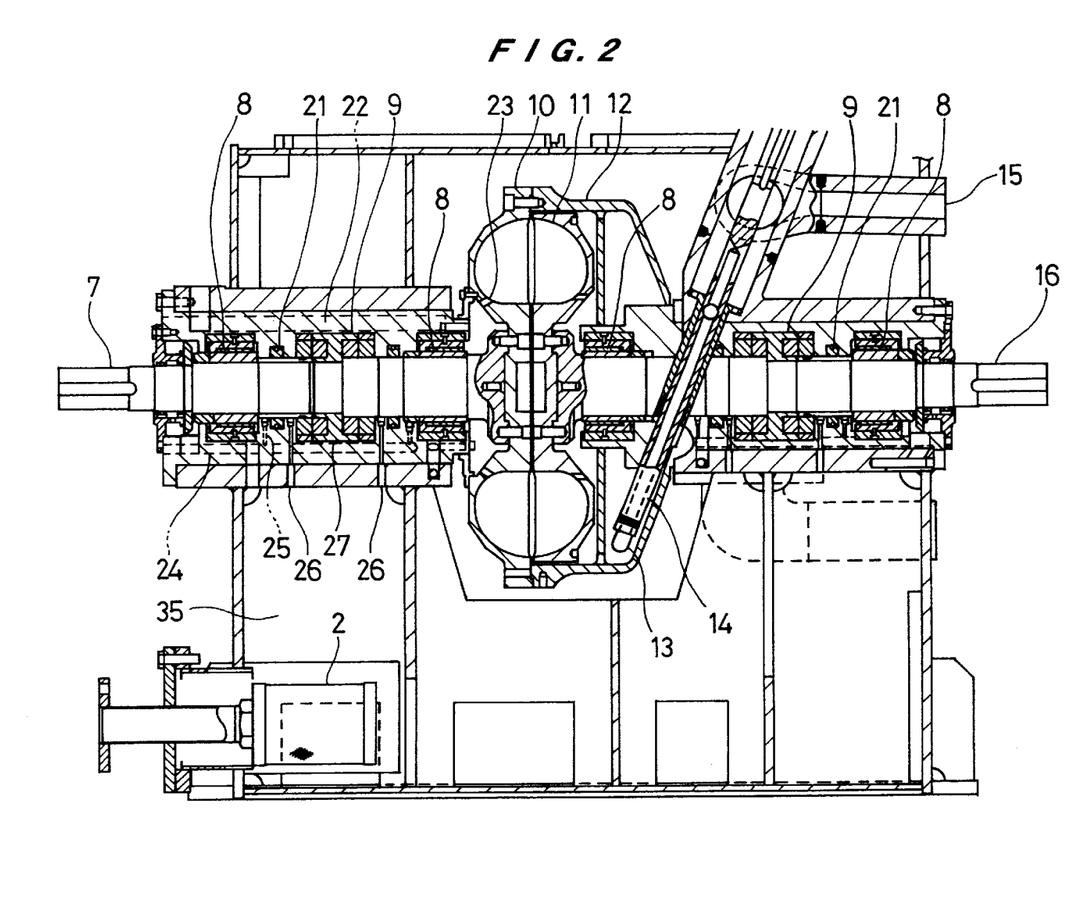
FIG. 2 is a cross-sectional view showing the detailed structure of the variable-speed fluid coupling shown in FIG. 1.

Structural details of the variable-speed fluid coupling according to the present invention will be described below with reference to FIG. 2. FIG. 2 is a cross-sectional view showing the detailed structure of the variable-speed fluid coupling. The water supplied from the pressurizing pump 1 (see FIG. 1) for transmitting power enters from a working water supply passage 22 into a chamber behind the impeller 10, then enters from a supply hole 23 in the impeller 10 into the chamber containing vanes of the impeller 10, i.e., the working chamber. The water is then given kinetic energy by the rotation of the impeller 10, and flows out of the impeller 10. The water which has flowed out of the impeller 10 flows into the runner 11, thereby transmitting kinetic energy of the water as rotational power of the output shaft 16. Since the water used for power transmission is supplied from the supply hole 23 in the impeller 10 at all times, extra water is drawn into the scoop tube 14, and passes through a drain port 15, and is returned to the water tank 35.

In the variable-speed fluid coupling, the scoop tube 14 having the nozzle 13 on its distal end is moved forward or backward by the hydraulic servo mechanism to control the amount of water in the impeller casing 12. Specifically, when the scoop tube 14 is inserted by an increased distance to reduce the amount of water in the impeller casing 12, the amount of transmitted power is reduced even if the input shaft 7 rotates at a constant rotational speed, thus reducing the rotational speed of the output shaft 16. The water drawn into the scoop tube 14 is discharged from the scoop tube drain port 15, and is returned to the water tank 35 in the lower portion of the variable-speed fluid coupling.

The lubricating water for the radial bearings 8 flows through the lubricating water filter 5 (see FIG. 1) and is supplied from a lubricating water supply passage 24 through lubricating water inlets 25 having a restriction to sides of the radial bearings 8. The lubricating water which has flowed into the radial bearings 8 lubricates the radial bearings 8, and then flows from a passage defined in a discharge side, and is returned to the water tank 35 in the lower portion of the variable-speed fluid coupling.

The lubricating water for the thrust bearing units 9 flows through the lubricating water filter 5 (see FIG. 1) and is supplied from the lubricating water supply passage 24 through lubricating water inlets 27 to the thrust bearing units 9. The lubricating water which has flowed into the thrust bearing units 9 flows from outer circumferential portions of the thrust bearing units 9 into the thrust bearings, and flows in inner circumferential portions of the thrust bearings and then along the shafts. Thereafter, the lubricating water is discharged from lubricating water drain ports 26 having a restriction unit, and is then returned to the water tank 35 in the lower portion of the variable-speed fluid coupling.

Figure 3:
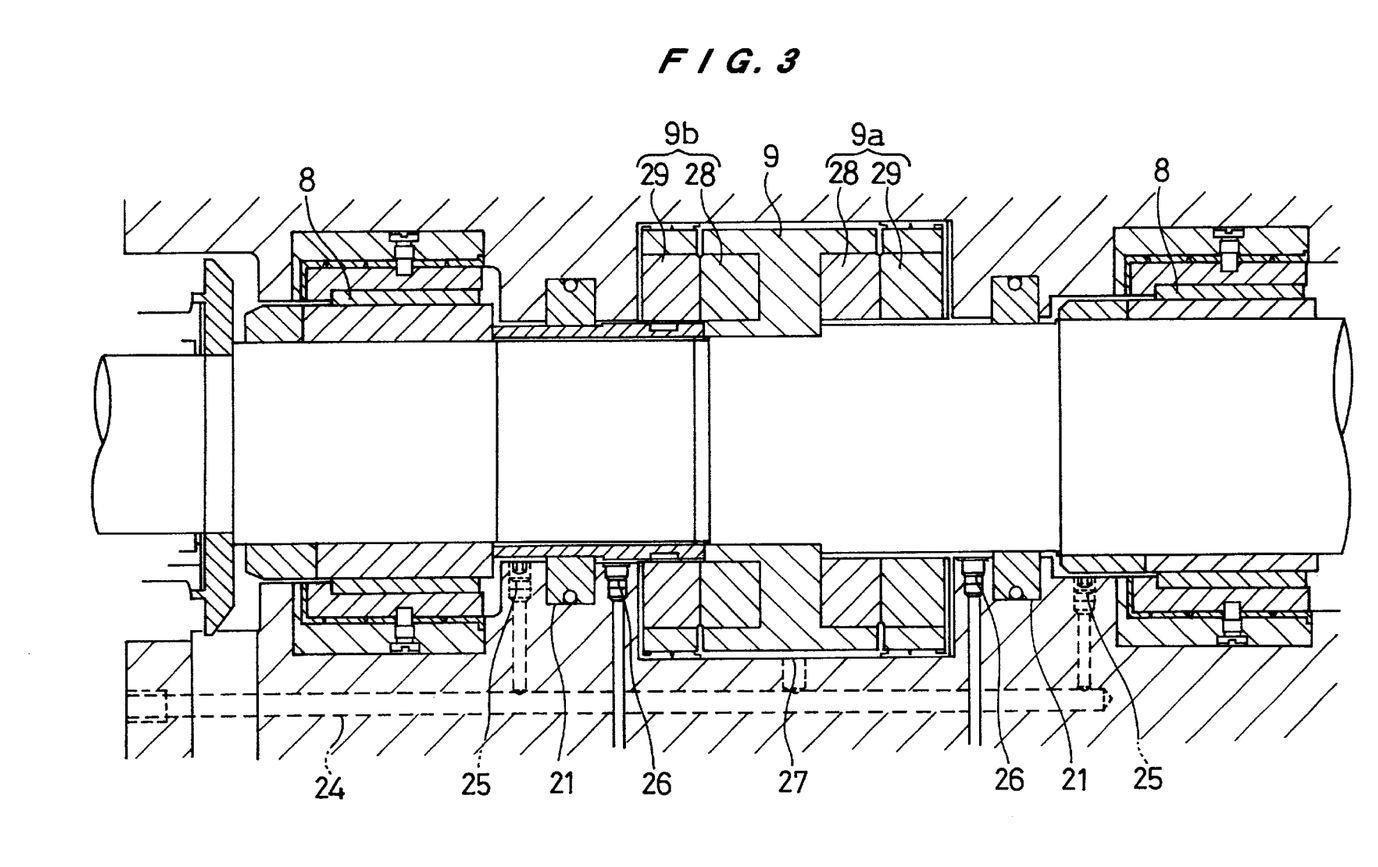
FIG. 3 is a cross-sectional view showing the detailed structure of bearings in the variable-speed fluid coupling shown in FIG. 1.

FIG. 3 is a cross-sectional view showing the detailed structure of bearings. As shown in FIG. 3, each of the radial bearings 8 comprises a sleeve bearing in the form of a cylindrical bushing. The lubricating water for the radial bearing 8 is supplied from the lubricating water inlet 25. Each of the thrust bearing units 9 comprises two types of rightward and leftward thrust bearings 9a, 9b capable of receiving thrust forces irrespective of whether the thrust forces are applied to the shaft in either a rightward or leftward direction. The thrust bearings 9a, 9b comprise plane bearings for receiving thrust forces with flat surfaces. Each of the thrust bearings 9a, 9b comprises a rotary thrust bearing 28 and a stationary thrust bearing 29. In each of the thrust bearings 9a, 9b, the rotary thrust bearing 28 and the stationary thrust bearing 29 are pressed by thrust forces and generate a surface pressure, and are lubricated by the water. At this time, in the thrust bearing which is not subjected to thrust forces, a slight gap is created between the rotary thrust bearing 28 and the stationary thrust bearing 29.

In order to prevent a large amount of lubricating water from flowing through the gap toward the radial bearing 8, a floating ring 21 is provided to minimize the leakage of water. Specifically, floating rings 21 are disposed one on each side of the thrust bearing unit 9 to allow the thrust bearings to be lubricated irrespective of whether the thrust load on the shaft is applied rightward or leftward. In order to prevent the lubricating water from flowing out of the thrust bearing which is not subjected to the thrust load through the gap therein, the lubricating water drain port 26 has a restriction unit to allow the lubricating water to flow in the thrust bearing which is subjected to thrust forces.

Figure 4:
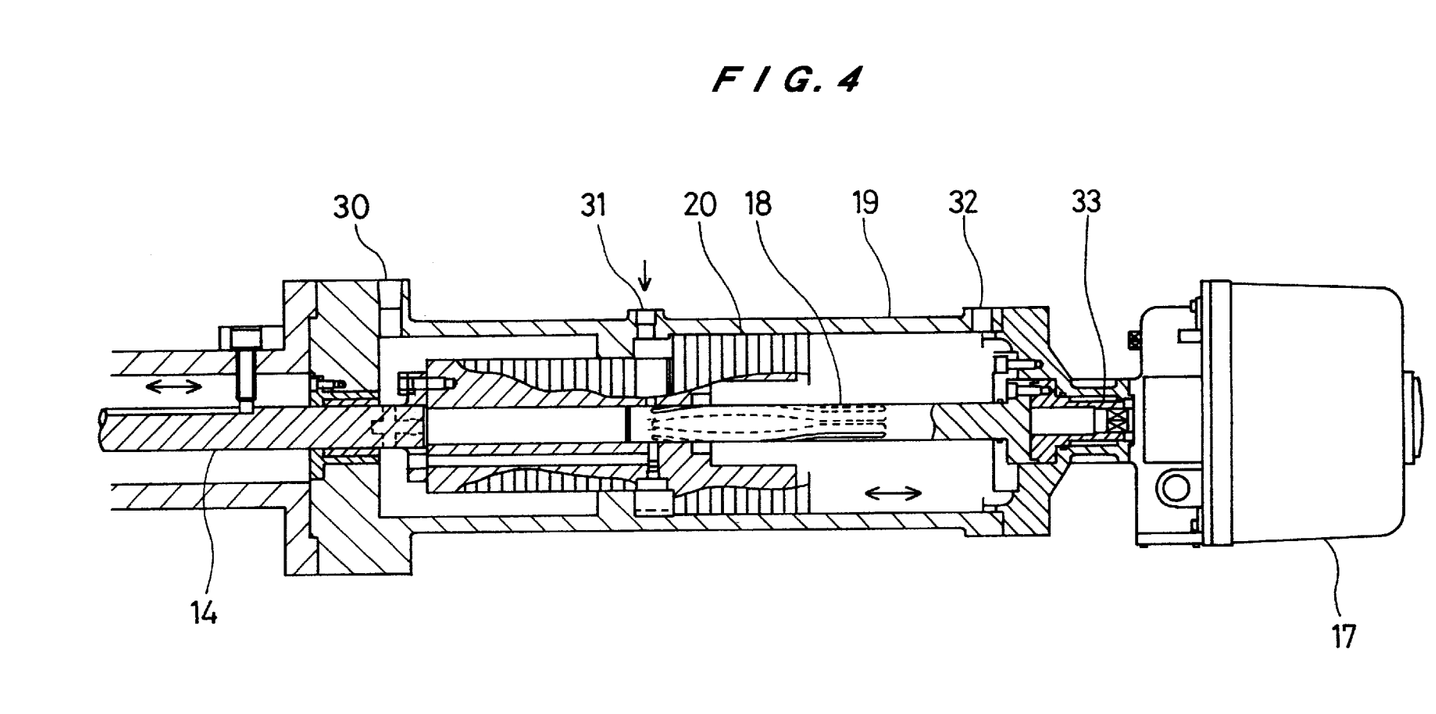
FIG. 4 is a cross-sectional view showing the detailed structure of a hydraulic servo mechanism in the variable-speed fluid coupling shown in FIG. 1.

The structure of the hydraulic servo mechanism for controlling the scoop tube will be described below with reference to FIG. 4. FIG. 4 is a cross-sectional view showing the detailed structure of the hydraulic servo mechanism. As shown in FIG. 4, the hydraulic servo mechanism comprises a pilot valve 18 coupled to the scoop tube 14, a servo actuator 17 for rotating the pilot valve 18, a follow-up piston 20 fixed to the pilot valve 18, and a housing 19 accommodating the follow-up piston 20 therein. The reference numeral 31 represents a control water inlet port for introducing the control water. The reference numeral 30 represents a control water drain port for discharging the control water. The reference numeral 32 represents an opening for venting air. The reference numeral 33 represents a shaft coupling interconnecting the servo actuator 17 and the pilot valve 18.

In the hydraulic servo mechanism shown in FIG. 4, when the servo actuator 17 which is operated by an electric signal rotates the pilot valve 18, the position of grooves defined in the surface of the pilot valve 18 changes to open the water passage to the end of the follow-up piston 20. Thus, the follow-up piston 20 is moved forward or backward to the position where the water passage is closed, and hence the scoop tube 14 coupled to the follow-up piston 20 is also moved forward or backward, thus controlling the amount of water in the impeller casing 12.

Figure 5A:
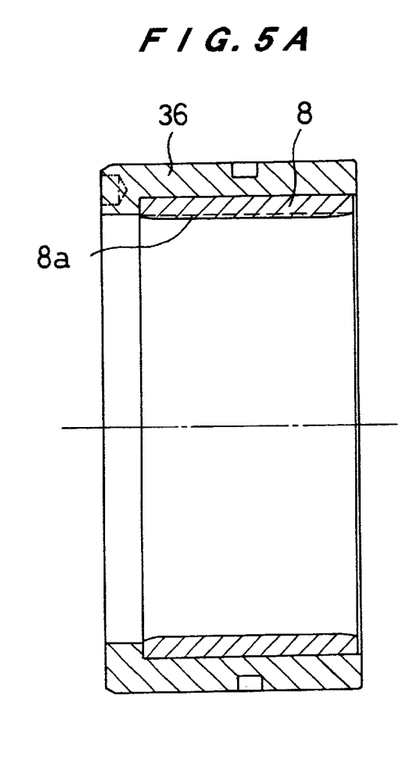
Figure 5B:
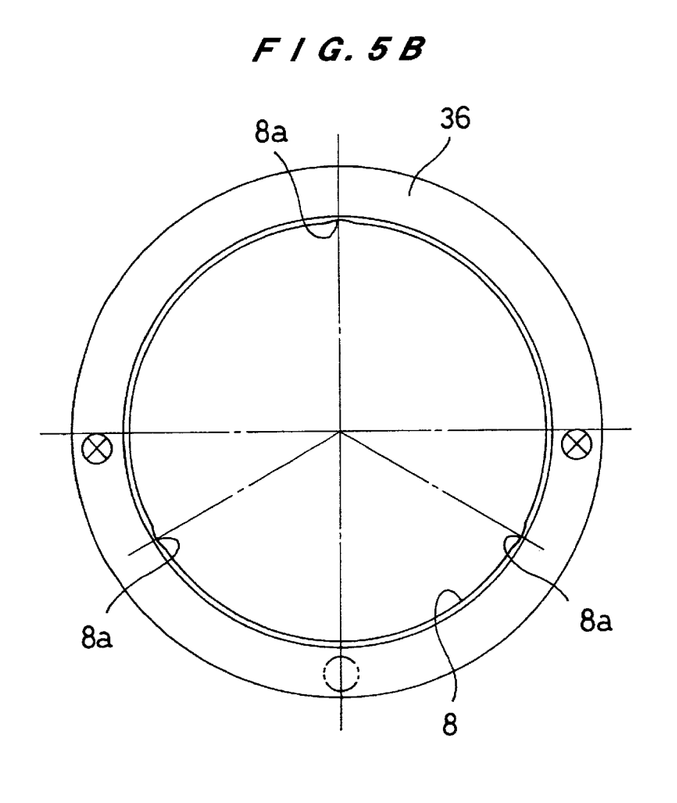

FIGS. 5A and 5B are views showing the structure of each of the radial bearings, and FIG. 5A is a cross-sectional view and FIG. 5B is a side elevational view. The radial bearing 8 comprises a sleeve bearing accommodated in a housing 36, and has three grooves 8a defined in an inner surface thereof which contacts the shaft, so that the radial bearing 8 has a structure for allowing the lubricating water to flow in easily.

Figure 6A:
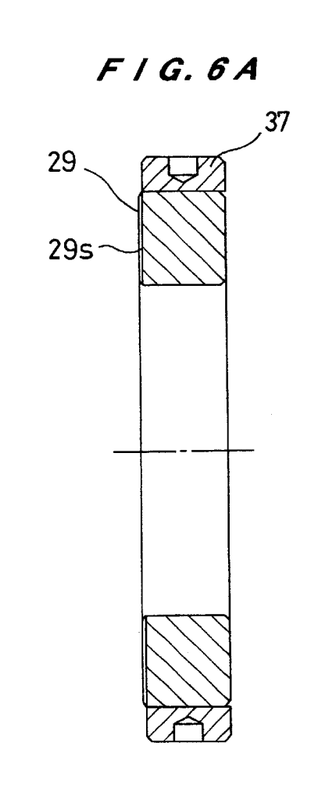
Figure 6B:
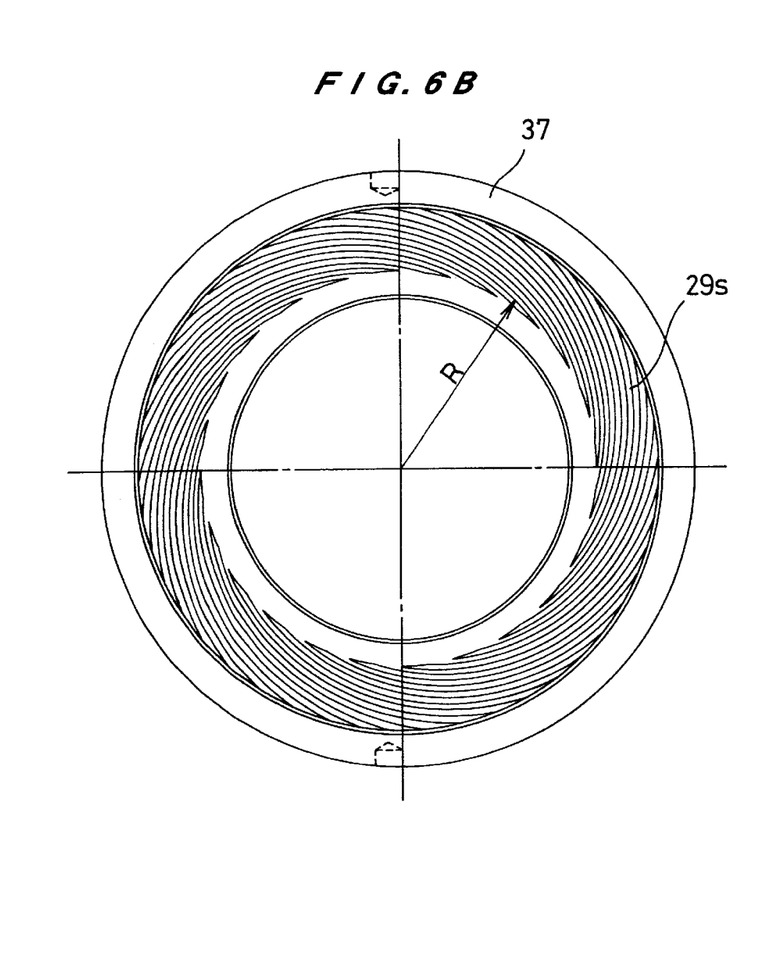

FIGS. 6A and 6B are views showing the structure of each of the stationary thrust bearings, and FIG. 6A is a cross-sectional view and FIG. 6B is a side elevational view. As shown in FIGS. 6A and 6B, the stationary thrust bearing 29 has very shallow spiral grooves 29s having a width of a few microns which are defined in a sliding surface thereof for bearing thrust loads. The lubricating water enters the spiral grooves 29s to thus produce a wedge effect for enabling the stationary thrust bearing to bear thrust forces. A protective tube 37 is disposed around the thrust bearing 29.

In FIGS. 1 through 6A and 6B, the present invention is applied to a variable-speed fluid coupling. However, the present invention is also applicable to a torque converter comprising a casing filled with a working fluid, a pump disposed in the casing and coupled to an input shaft, a turbine disposed in the casing and coupled to an output shaft, and a stator disposed in and fixed to the casing. In this torque converter, by rotating the turbine with the energy of the working fluid given by the pump, the working fluid is returned via the stator to the pump, and the speed and torque of the output shaft are automatically variable according to the load even though the speed and torque of the input shaft are constant. The torque converter uses radial bearings 8 and thrust bearing units 9 which are identical to those shown in FIGS. 2, 3, 5A, 5B, 6A and 6B.

The variable-speed fluid coupling shown in FIGS. 1 through 6A and 6B has a shaft sealing structure shown in FIG. 8 which is disposed on each of both shaft ends of the input shaft 7 and the output shaft 16. As shown in FIG. 8, a single labyrinth structure L is provided outside of the radial bearing 8 for preventing water as a working fluid from leaking out.

According to the present invention, as described above, it is not necessary to use oil in a fluid coupling and a torque converter which take out kinetic energy given to a fluid by a prime mover as rotational power, and the danger of environmental pollution caused at the time of the maintenance and management of such oil is eliminated. Any treatment of waste oil after its usage over a long period of time is not needed.

By replacing oil with water as a working fluid for power transmission and also a lubricating fluid for the bearings in the power transmission apparatus, the following advantages can be obtained:

(1) The power transmission apparatus can be used in explosion-proof regions.

(2) Since water used as the above fluid has a larger specific heat than oil, any cooling device for the fluid may be small in size.

(3) If the fluid is oil as in the conventional apparatus, an air-cooling or water-cooling device is required to cool the fluid. Particularly, the air-cooling device is large in size and needs a large installation area. Conversely, the water-cooling device is small in size and needs a small installation area. Therefore, the water-cooling device is used in normal applications.

In this case, when the power transmission apparatus is not supplied with electric power due to a power failure, the water-cooling device is unable to cool the high-temperature oil, thus causing the oil temperature to increase to an ignition point and leading to a fire.

According to the present invention, however, since the fluid is water, even when the above situation arises, fatal problems such as a fire are not caused by an increase in the temperature of the fluid.

INDUSTRIAL APPLICABILITY the present invention relates to a power transmission apparatus for transmitting power by utilizing kinetic energy of a fluid, and can be utilized as a torque converter, a fluid coupling, or the like.

What is claimed is:

1. A power transmission apparatus for taking out kinetic energy given to a fluid for power transmission by a prime mover as rotational power, characterized in that:

water is used as the fluid for power transmission and a lubricating fluid for a radial bearing and a thrust bearing in said power transmission apparatus.

2. An apparatus according to claim 1, wherein water is used in a control apparatus in said power transmission apparatus.

3. An apparatus according to claim 1, wherein said power transmission apparatus comprises a variable-speed fluid coupling or a constant-speed fluid coupling having an impeller and a runner.

4. An apparatus according to claim 1, wherein said power transmission apparatus comprises a torque converter having a pump, a turbine, and a stator.

5. An apparatus according to claim 1, wherein said radial bearing comprises a sleeve bearing.

6. An apparatus according to claim 1, wherein said thrust bearing comprises a spiral hydrodynamic bearing.

7. In a power transmission apparatus for taking out kinetic energy given to a fluid for power transmission by a prime mover as rotational power, a variable-speed fluid coupling characterized in that:

water is supplied as a working fluid to a coupling section comprising an impeller and a runner;

water is supplied as a lubricating fluid to lubricate bearings a radial and a thrust bearing for supporting an input shaft and an output shaft which are connected respectively to said impeller and said runner; and water is supplied as a working fluid in a hydraulic servo mechanism for controlling a scoop tube for adjusting the amount of water in said coupling section.

8. A power transmission apparatus according to claim 7, wherein said radial bearing comprises a sleeve bearing.

9. A power transmission apparatus according to claim 7, wherein said thrust bearing comprises a spiral hydrodynamic bearing.

* * * * *

UNITED STATES PATENT AND TRADEMARK OFFICE
CERTIFICATE OF CORRECTION

PATENT NO. : 6,725,657 B1
DATED : April 27, 2004
INVENTOR(S) : Katsumi Kimura et al It is certified that error appears in the above-identified patent and that said Letters Patent is hereby corrected as shown below:

<u>Column 8,</u>
Lines 5-6, "lubricate bearing a radial and" should be -- lubricate a radial bearing and --.

Signed and Sealed this

Fourteenth Day of September, 2004

JON W. DUDAS
*Director of the United States Patent and Trademark Office*